(12) United States Patent
Nishio et al.

(10) Patent No.: US 10,694,505 B2
(45) Date of Patent: *Jun. 23, 2020

(54) INTEGRATED CIRCUIT

(71) Applicant: Sun Patent Trust, New York, NY (US)

(72) Inventors: Akihiko Nishio, Osaka (JP); Toru Oizumi, Kanagawa (JP); Ayako Horiuchi, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,225

(22) Filed: Aug. 10, 2018

(65) Prior Publication Data
US 2018/0352543 A1 Dec. 6, 2018

Related U.S. Application Data

(63) Continuation of application No. 15/841,012, filed on Dec. 13, 2017, now Pat. No. 10,075,942, which is a
(Continued)

(30) Foreign Application Priority Data

Mar. 9, 2012 (JP) ................................ 2012-053388

(51) Int. Cl.
*H04W 4/00* (2018.01)
*H04W 72/04* (2009.01)
(Continued)

(52) U.S. Cl.
CPC ....... *H04W 72/0406* (2013.01); *H04L 1/1671* (2013.01); *H04L 5/001* (2013.01);
(Continued)

(58) Field of Classification Search
CPC .. H04W 72/0406; H04L 5/0057; H04L 5/001; H04L 1/1671; H04L 5/0055; H04L 1/0026
(Continued)

(56) References Cited

U.S. PATENT DOCUMENTS

2005/0276249 A1* 12/2005 Damnjanovic ....... H04L 1/1841
370/335
2011/0312332 A1* 12/2011 Choudhury ........... H04L 1/0026
455/452.2
(Continued)

FOREIGN PATENT DOCUMENTS

EP 2 385 736 A1 11/2011
WO 2012/029246 A1 8/2012

OTHER PUBLICATIONS

Qualcomm, Clarification of parallel PUCCH and PUSCH transmission, May 9-13, 2011 (From Applicat's IDS) (Year: 2011).*
(Continued)

*Primary Examiner* — Mang Hang Yeung
(74) *Attorney, Agent, or Firm* — Seed IP Law Group LLP

(57) ABSTRACT

Provided are a wireless communication terminal device and a control channel forming method with which, in the forming of a control channel for transmitting control information including an ACK/NACK and CSI (channel state information), wasteful use of resources is reduced compared to that in related art. In the case where CSI is transmitted independently, and in the case where CSI and an ACK/NACK are transmitted at the same time, the same format is used to form a control channel. Furthermore, in the case where an ACK/NACK is transmitted independently, another format is used if a component carrier (CC) number is equal to or less than 2, and the same format is used if the CC number is equal to or greater than 3.

14 Claims, 12 Drawing Sheets

Related U.S. Application Data continuation of application No. 14/378,294, filed as application No. PCT/JP2013/001006 on Feb. 22, 2013, now Pat. No. 9,877,306.

(51) Int. Cl.
  *H04L 1/16* (2006.01)
  *H04L 5/00* (2006.01)
  *H04L 1/00* (2006.01)

(52) U.S. Cl.
  CPC .......... *H04L 5/0055* (2013.01); *H04L 5/0057* (2013.01); *H04L 1/0026* (2013.01)

(58) Field of Classification Search
  USPC .......................................................... 370/329
  See application file for complete search history.

(56) References Cited

U.S. PATENT DOCUMENTS

| | | | |
|---|---|---|---|
| 2012/0039280 A1 | 2/2012 | Chen et al. | |
| 2012/0046032 A1 | 2/2012 | Baldemair et al. | |
| 2012/0088533 A1* | 4/2012 | Khoshnevis | H04L 1/0026 455/509 |
| 2012/0113832 A1 | 5/2012 | Montojo et al. | |
| 2012/0120817 A1* | 5/2012 | Khoshnevis | H04L 1/0026 370/252 |
| 2013/0083741 A1* | 4/2013 | Larsson | H04L 5/0094 370/329 |
| 2013/0083753 A1* | 4/2013 | Lee | H04W 72/0453 370/329 |
| 2013/0121271 A1* | 5/2013 | Chen | H04W 72/02 370/329 |
| 2013/0128857 A1 | 5/2013 | Nakao | |
| 2013/0188589 A1* | 7/2013 | Nakashima | H04B 7/0404 370/329 |
| 2013/0195063 A1 | 8/2013 | Ahn et al. | |
| 2013/0215807 A1* | 8/2013 | Yang | H04L 1/0026 370/281 |
| 2013/0301448 A1* | 11/2013 | Sayana | H04W 24/10 370/252 |
| 2014/0376424 A1 | 12/2014 | Seo et al. | |

OTHER PUBLICATIONS

3GPP TS 36.211 V10.3.0, "3rd Generation Partnership Project; Technical Specification Group Radio Access Network; Evolved Universal Terrestrial Radio Access (E-UTRA); Physical Channels and Modulation (Release 10)," Sep. 2011, 103 pages.

3GPP TS 36.212 V10.3.0, "3rd Generation Partnership Project; Technical Specification Group Radio Access Network; Evolved Universal Terrestrial Radio Access (E-UTRA); Multiplexing and channel coding (Release 10)," Sep. 2011, 79 pages.

3GPP TS 36.213 V10.3.0, "3rd Generation Partnership Project; Technical Specification Group Radio Access Network; Evolved Universal Terrestrial Radio Access (E-UTRA); Physical layer procedures (Release 10)," Sep. 2011, 122 pages.

Ericsson, ST-Ericsson, "TDD ACK/NACK on PUCCH," R1-105685, Agenda Item: 6.2.1.1, TSG-RAN WG1 #62bis, Xian, China, Oct. 11-15, 2010, 3 pages.

Huawei, HiSilicon, "Simultaneous transmission of periodic CSI and HARQ-ACK," R1-120012, Agenda Item: 7.2.1.2.1, 3GPP TSG RAN WG1 Meeting #68, Dresden, Germany, Feb. 6-10, 2012, 5 pages.

International Search Report, dated May 7, 2013, for International Application No. PCT/JP2013/001006, 3 pages.

LG Electronics, "ACK/NACK resource allocation for FDD," R1-105339, Agenda Item: 6.2.1.1, 3GPP TSG RAN WG1 #62bis, Xian, China, Oct. 11-15, 2010, 9 pages.

Motorola, "Introduction of Rel-10 LTE-Advanced features in 36.213," R1-106450, 3GPP TSG-RAN Meeting #63, Jacksonville, USA, Nov. 15-19, 2010, 90 pages.

Qualcomm Incorporated, "Clarification of parallel PUCCH and PUSCH transmission," R1-111803, Agenda Item: 6.2.1, 3GPP TSG-RAN WG1 #65, Barcelona, Spain, May 9-13, 2011, 4 pages.

Texas Instruments, "On Enhancements to HARQ-ACK Signaling for CA," R1-113778, Agenda Item: 7.2.1.2, 3GPP TSG RAN WG1 #67, San Francisco, USA, Nov. 14-18, 2011, 3 pages.

* cited by examiner

INTEGRATED CIRCUIT

TECHNICAL FIELD

The present invention relates to a radio communication terminal apparatus and a control channel formation method in a mobile communication system that transmits control information through a channel used on an uplink.

BACKGROUND ART

3GPP (3rd Generation Partnership Project) has standardized LTE (Long Term Evolution) and LTE-Advanced, and is currently proceeding with the standardization for further enhancement in order to achieve high-speed and high-capacity communication between a radio communication base station apparatus (hereinafter abbreviated as "base station") and a radio communication terminal apparatus (hereinafter abbreviated as "terminal").

LTE and LTE-Advanced adopt OFDMA (Orthogonal Frequency Division Multiple Access) as a downlink communication scheme and SC-FDMA (Single Carrier Frequency Division Multiple Access) as an uplink communication scheme.

Channels and signals used on an uplink include, for example, PUSCH (Physical Uplink Shared Channel) and PUCCH (Physical Uplink Control Channel). PUSCH is a channel for transmitting a data signal. PUCCH is a channel for transmitting control information such as ACK/NACK or CSI (Channel State Information).

ACK/NACK is information indicating an error detection result of downlink data of each transport block (TB) transmitted from a base station and is 1-bit information indicating either ACK (no error) or NACK (error).

CSI is information indicating a measurement result of downlink channel quality. CSI includes CQI (Channel Quality Indicator), PMI (Precoding Matrix Indicator) and RI (Rank Indicator).

Here, LTE-Advanced Release 10 (hereinafter described as "Rel. 10") supports carrier aggregation (CA) that operates a plurality of unit carriers (component carriers, hereinafter called "CCs") based on the unit of a frequency bandwidth of a maximum of 20 MHz (that is, maximum frequency bandwidth in LTE) bundled together in order to support wideband transmission (e.g., see NPLs 1, 2 and 3). In CA, one PCC (Primary Component Carrier) and one or more SCCs (Secondary Component Carriers) are configured. The 3GPP specification may describe CC as a cell, PCC as a PCell (Primary Cell), and SCC as an SCell (Secondary Cell). When a plurality of CCs are used on an uplink, PUCCH is transmitted by only PCC so as not to increase PAPR (Peak to Average Power Ratio).

In Rel. 10, it is possible to use different PUCCH transmission formats according to the number of downlink CCs (hereinafter, simply described as "the number of CCs") supported by a terminal, that is, the number of ACK/NACKs fed back by the terminal. More specifically, when the number of CCs is 1, the terminal uses format 1a/1b to feed back ACK/NACK to a base station. When the number of CCs is 2, the terminal uses channel selection using format 1b to feed back ACK/NACK to the base station. On the other hand, when the number of ACK/NACKs is 3 or more, the terminal uses format 3 to feed back ACK/NACKs to the base station.

Rel. 10 defines two types of CSI feedback method: periodic CSI and aperiodic CSI. With aperiodic CSI, the terminal feeds back CSI only once at timing instructed by the base station. With periodic CSI, the terminal feeds back CSI to the base station using format 2 at reporting cycles (e.g., 5 ms, 10 ms) configured for each terminal.

Format 1a/1b is a transmission format in which a channel is divided into Ncs×Noc$^{(1)}$ portions within one RB with Ncs cyclic shifts and Noc$^{(1)}$ OCC sequences. Note that signal points of BPSK are used for format 1a and signal points of QPSK are used for format 1b. Format 2 is a transmission format in which a channel is divided by Ncs cyclic shifts within one RB. Format 3 is a transmission format in which a channel is divided into Noc$^{(3)}$ portions within one RB. Note that Ncs=12, Noc$^{(1)}$=3, and Noc$^{(3)}$=4 or 5.

The transmission capacity of format 1a is 1 bit. The transmission capacity of format 1b is 2 bits. The transmission capacity of channel selection using format 1b is 4 bits. The transmission capacity of format 2 is 13 bits. The transmission capacity of format 3 is 21 bits.

Resources (transmission capacity) for the terminal to transmit ACK/NACK and periodic CSI are reserved. The resources reserved for periodic CSI are indicated from the base station to the terminal by RRC signaling semi-statically.

In Rel. 10, when ACK/NACK and periodic CSI are assigned to the same subframe, ACK/NACK is given priority over periodic CSI and periodic CSI is dropped (not transmitted). However, if periodic CSI is dropped frequently, the measurement accuracy of downlink channel quality deteriorates.

Thus, in Release 11 (hereinafter described as "Rel. 11"), which is LTE-Advanced, studies are being carried out on the possibility of supporting multiplexed transmission of ACK/NACK and periodic CSI when transmission subframes of ACK/NACK and periodic CSI overlap (e.g., NPL 4).

NPL 4 describes that format 3 is used when ACK/NACK and periodic CSI (hereinafter described as "CSI") are simultaneously transmitted, and a PUCCH transmission format of Rel. 10 is used otherwise, that is, when ACK/NACK or CSI is singly transmitted. That is, ACK/NACK is transmitted in format 1b when the number of CCs is 1 or 2 and transmitted in format 3 when the number of CCs is 3 or more. CSI is transmitted in format 2.

CITATION LIST

Non-Patent Literature

NPL 1
3GPP TS 36.211 V10.3.0, "Physical Channels and Modulation (Release 10)," September, 2011
NPL 2
3GPP TS 36.212 V10.3.0, "Multiplexing and channel coding (Release 10)," September 2011
NPL 3
3GPP TS 36.213 V10.3.0, "Physical layer procedures (Release 10)," September 2011
NPL 4
3GPP TSG RAN WG1 meeting, R1-113778 (November 2011)

SUMMARY OF INVENTION

Technical Problem

Whether or not downlink data is transmitted is determined by scheduling in units of subframes by the base station and this is transmitted in the fourth subframe from (that is, 4 ms after) a subframe in which downlink data is received. For this reason, the terminal cannot know timing of transmitting ACK/NACK beforehand.

According to the method described in NPL 4, the terminal needs to reserve resources of both format 2 and format 3 in order to be prepared for CSI single transmission and for simultaneous transmission with ACK/NACK at the transmission timing of CSI.

Therefore, according to the method described in NPL 4, when ACK/NACK and CSI are simultaneously transmitted, the reserved format 2 resources become vacant, and when CSI is singly transmitted, the reserved format 3 resources become vacant. Thus, according to the method described in NPL 4, more resources are wasted.

An object of the present invention is to reduce such waste of resources.

Solution to Problem

A radio communication terminal apparatus according to an aspect of the present invention includes: a formation section that forms a control channel for transmitting control information including at least one of ACK/NACK and CSI (Channel State Information), using one of a plurality of formats; and a transmitting section that transmits the formed control channel, in which the formation section uses a first format when the control information includes only the CSI out of the ACK/NACK and the CSI, and when the control information includes the ACK/NACK and the CSI.

A control channel formation method according to an aspect of the present invention is a method for forming a control channel for transmitting control information including at least one of ACK/NACK and CSI (Channel State Information), using one of a plurality of formats, the method including forming the control channel using a first format when the control information includes only the CSI out of the ACK/NACK and the CSI, and when the control information includes the ACK/NACK and the CSI.

Advantageous Effects of Invention

According to the present invention, it is possible to reduce waste of resources in mapping of ACK/NACK and CSI compared to the related art.

DESCRIPTION OF EMBODIMENTS

Hereinafter, each embodiment of the present invention will be described in detail with reference to the accompanying drawings. Hereinafter, an FDD (Frequency Division Duplex) system will be described as an example.

Embodiment 1

[Configuration of Terminal]

Figure 1:
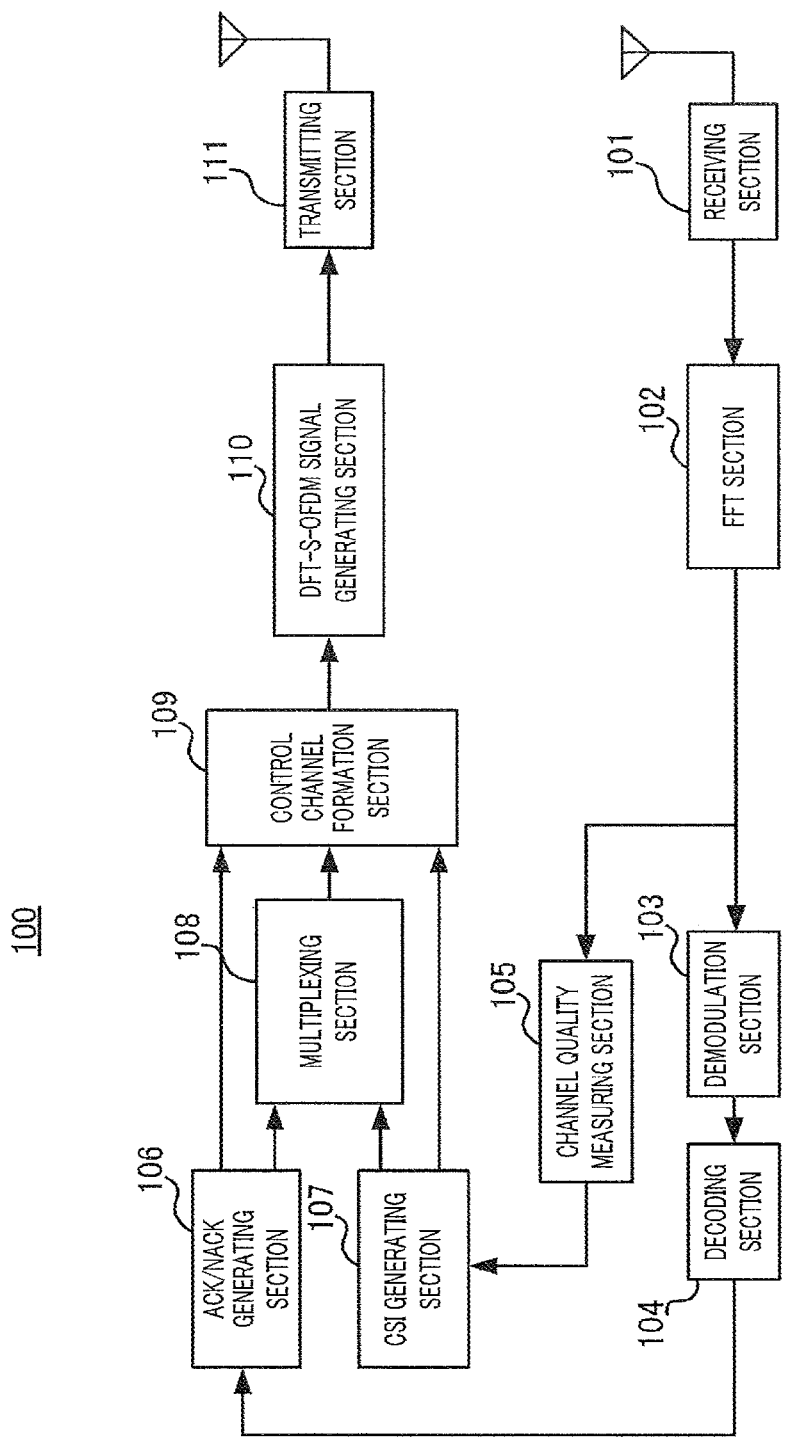
FIG. 1 is a block diagram illustrating a configuration of a terminal according to Embodiment 1 of the present invention.

FIG. 1 is a block diagram illustrating a configuration of a terminal according to Embodiment 1 of the present invention. Terminal 100 shown in FIG. 1 is mainly configured of receiving section 101, FFT section 102, demodulation section 103, decoding section 104, channel quality measuring section 105, ACK/NACK generating section 106, CSI generating section 107, multiplexing section 108, control channel formation section 109, DFT-S-OFDM signal generating section 110 and transmitting section 111.

Receiving section 101 performs RF processing such as down-conversion or AD conversion on a radio signal transmitted from base station 200 (see FIG. 2) and received via an antenna, and obtains a baseband OFDM signal.

FFT section 102 performs FFT processing on the OFDM signal outputted from receiving section 101 to thereby transform the signal into a frequency domain signal. Demodulation section 103 performs demodulation processing on the signal outputted from FFT section 102 and extracts data. Decoding section 104 performs error correction processing such as turbo decoding and error detection processing such as CRC detection on the data outputted from demodulation section 103.

Channel quality measuring section 105 measures channel quality using a reference signal included in the output signal of FFT section 102. The channel quality includes rank of propagation path, information on directivity (that is, precoding method on the transmitting side received with high receiving quality), receiving power and receiving quality such as SIR and SINR.

ACK/NACK generating section 106 generates ACK/NACK based on the error detection result of decoding section 104. More specifically, ACK/NACK generating section 106 generates ACK when no error is detected and generates NACK when an error is detected.

CSI generating section 107 generates CQI, PMI and RI from the channel quality measured by channel quality measuring section 105 and generates CSI by integrating the information.

When CSI and ACK/NACK are transmitted in the same subframe, multiplexing section 108 multiplexes the ACK/NACK outputted from ACK/NACK generating section 106 and the CSI outputted from CSI generating section 107. As an example of the multiplexing method, a method is used whereby CSI and ACK/NACK are encoded (e.g., Reed Muller coding or convolutional coding) respectively, and then interleaved to generate a transmission bit string. Note that cycles (timings) of subframes in which CSI is transmitted are configured beforehand. A subframe in which ACK/NACK is transmitted is the fourth subframe from the subframe in which downlink data is received.

Control channel formation section 109 reserves a predetermined PUCCH transmission resource and forms PUCCH for transmitting control information including ACK/NACK and/or CSI in accordance with each of the cases of ACK/NACK single transmission, CSI single transmission and ACK/NACK and CSI simultaneous transmission using predetermined formats. Details of the processing carried out by control channel formation section 109 will be described later.

DFT-S-OFDM signal generating section 110 performs DFT, mapping to subcarriers and IFFT processing on (not shown) PUSCH (data signal) and PUCCH (control information) outputted from control channel formation section 109 to thereby generate a time domain DFT-S-OFDM signal.

Transmitting section 111 performs RF processing such as D/A conversion or up-conversion on the DFT-S-OFDM signal outputted from DFT-S-OFDM signal generating section 110 and transmits a radio signal to base station 200 via an antenna.

[Configuration of Base Station]

Figure 2:
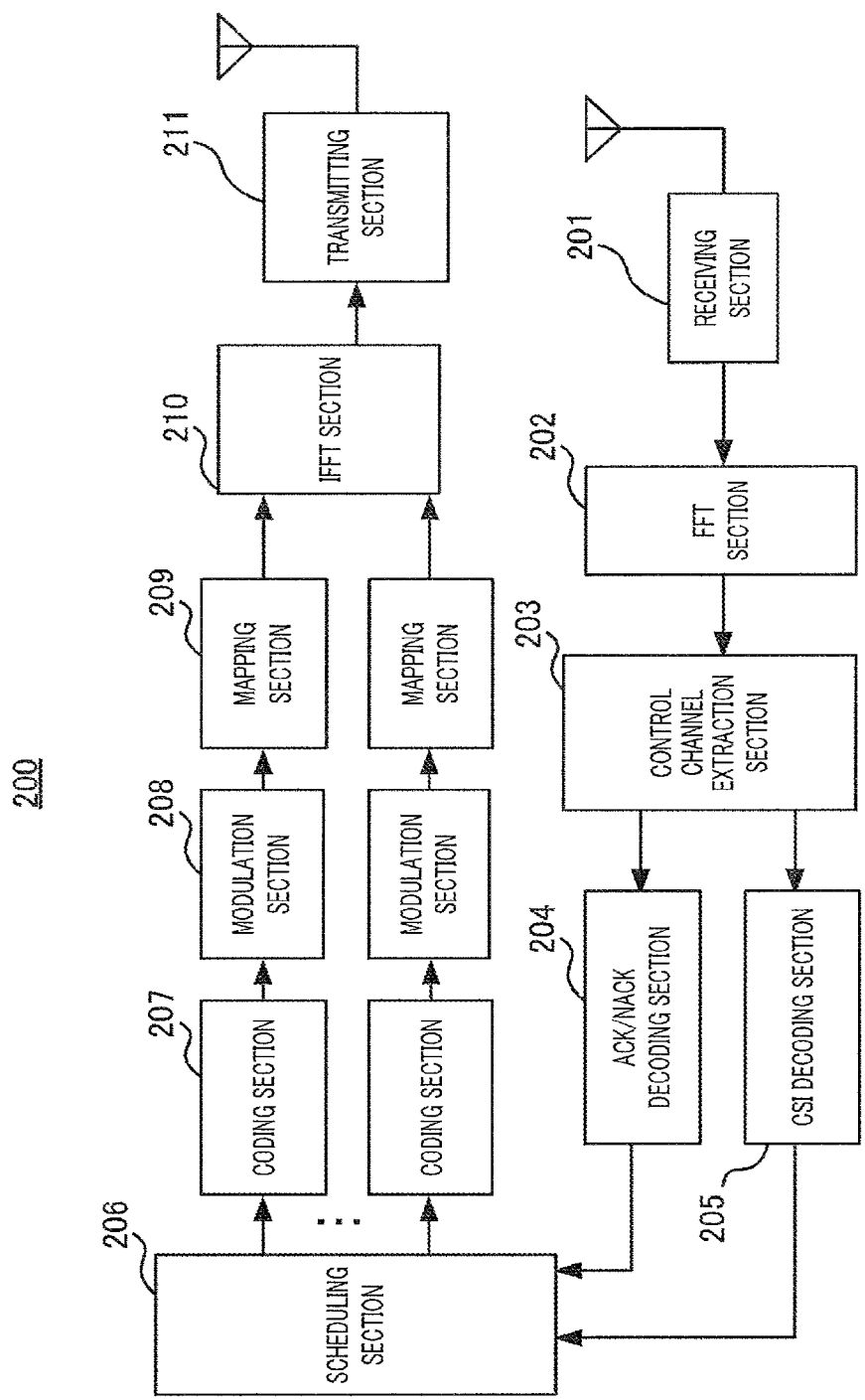
FIG. 2 is a block diagram illustrating a configuration of a base station according to Embodiment 1 of the present invention.

FIG. 2 is a block diagram illustrating a configuration of a base station according to Embodiment 1 of the present invention. Base station 200 shown in FIG. 2 is mainly configured of receiving section 201, FFT section 202, control channel extraction section 203, ACK/NACK demodulation section 204, CSI decoding section 205, scheduling section 206, coding section 207, modulation section 208, mapping section 209, IFFT section 210, and transmitting section 211.

Receiving section 201 performs RF processing such as down-conversion or AD conversion on a radio signal transmitted from terminal 100 and received via an antenna and obtains a baseband DFT-S-OFDM signal.

FFT section 202 performs FFT processing on the DFT-S-OFDM signal outputted from receiving section 201 to thereby transform the DFT-S-OFDM signal into a frequency domain signal. Control channel extraction section 203 extracts PUCCH (control information) from the signal outputted from FFT section 202 and further divides the information into an ACK/NACK signal and a CSI signal.

ACK/NACK demodulation section 204 performs decoding processing on the ACK/NACK signal outputted from control channel extraction section 203 and extracts ACK/NACK. CSI decoding section 205 performs decoding processing on the CSI signal outputted from control channel extraction section 203 and extracts CSI.

Scheduling section 206 performs scheduling based on the ACK/NACK and CSI transmitted from each terminal and outputs the next data to be transmitted.

Coding section 207 performs coding processing such as turbo coding on the data outputted from scheduling section 206. Modulation section 208 performs modulation processing such as QPSK on the data outputted from coding section 207. Mapping section 209 maps the signal outputted from modulation section 208 to an RB.

IFFT section 210 performs IFFT processing on the signal outputted from mapping section 209 to thereby generate a time domain OFDM signal.

Transmitting section 211 performs RF processing such as D/A conversion or up-conversion on the OFDM signal outputted from IFFT section 210 and transmits a radio signal to terminal 100 via an antenna.

Figure 3:
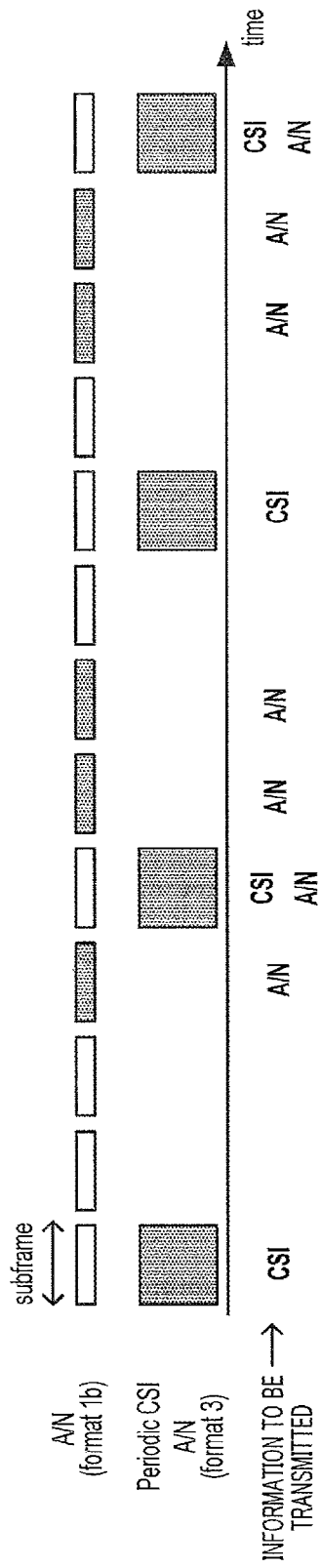
FIG. 3 illustrates an example of Embodiment 1 of the present invention.
Figure 4:
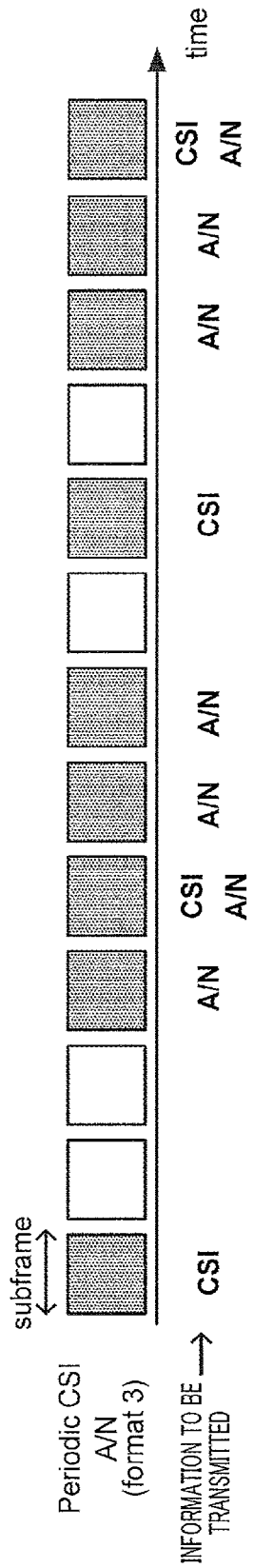
FIG. 4 illustrates an example of Embodiment 1 of the present invention.

Next, a control channel formation method by terminal 100 according to the present embodiment will be described. FIG. 3 illustrates an example of the present embodiment when the number of CCs is 2 or less. FIG. 4 illustrates an example of the present embodiment when the number of CCs is 3 or more. Note that in FIG. 3 and FIG. 4, white regions illustrate resources that are reserved but not used. A/N indicates ACK/NACK.

The present embodiment uses format 3 (same transmission format) for when singly transmitting CSI and for when CSI and ACK/NACK are simultaneously transmitted (hereinafter, "simultaneously transmitted" includes "multiplexed and transmitted") as well. When ACK/NACK is singly transmitted, the present embodiment uses format 1b if the number of CCs is 2 or less and uses format 3 if the number of CCs is 3 or more.

For this reason, when the number of CCs is 2 or less as shown in FIG. 3, the terminal always (in every subframe) reserves resources of format 1b and at the same time reserves resources of format 3 at transmission timing of CSI. On the other hand, when the number of CCs is 3 or more as shown in FIG. 4, the terminal always reserves resources of format 3.

Figure 5:
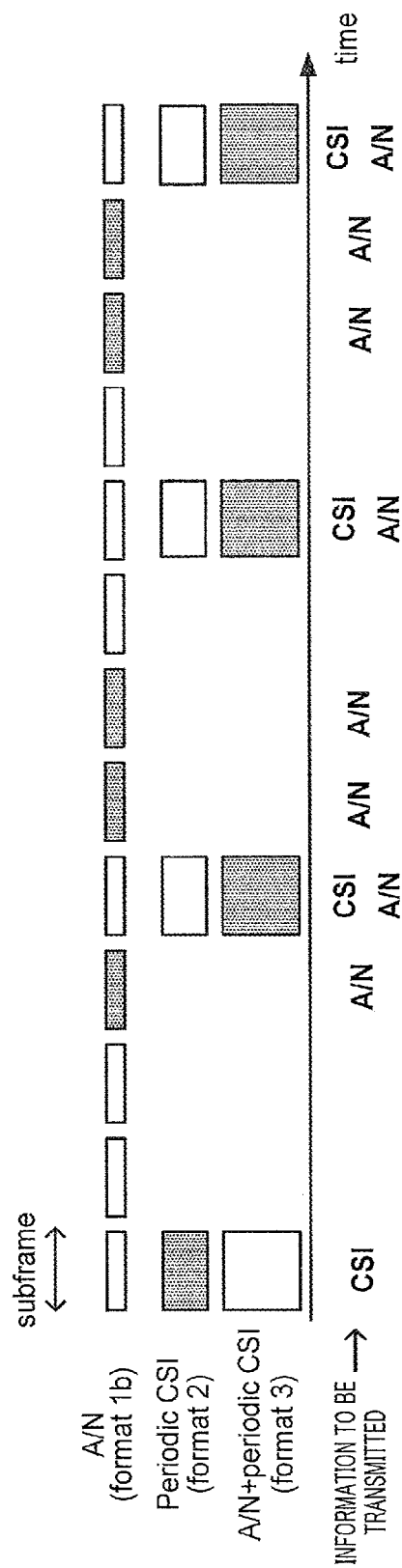
FIG. 5 illustrates an example of a conventional method.
Figure 6:
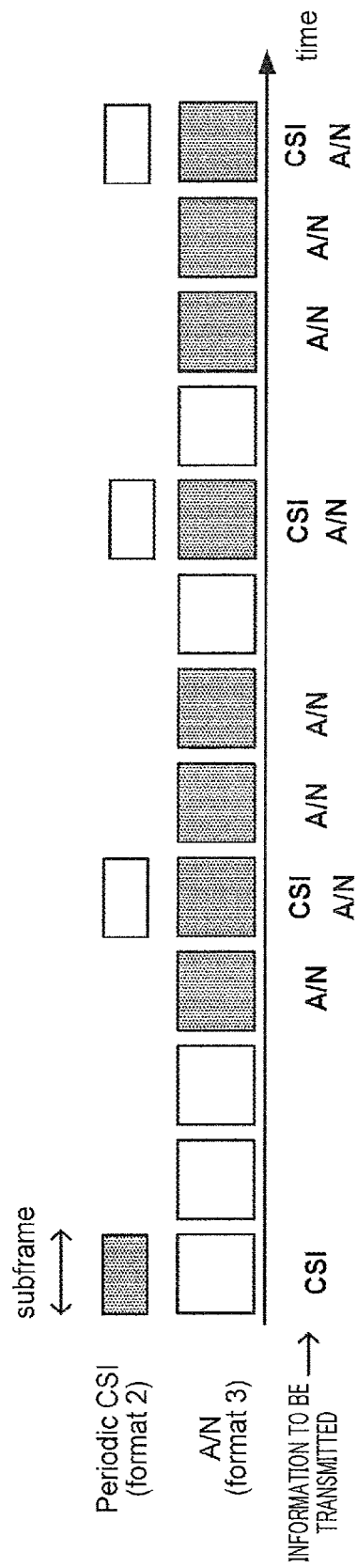
FIG. 6 illustrates an example of a conventional method.

FIG. 5 illustrates an example of a conventional method when the number of CCs is 2 or less. FIG. 6 illustrates an example of a conventional method when the number of CCs is 3 or more. In FIG. 5 and FIG. 6, white regions indicate resources reserved but not used. A/N indicates ACK/NACK.

Since the conventional method uses format 2 when singly transmitting CSI as shown in FIG. 5 and FIG. 6, reserved format 2 resources may be vacant if ACK/NACK and CSI are simultaneously transmitted, whereas when CSI is singly transmitted, reserved format 3 resources may be vacant. As shown above, according to the conventional method, more resources are unused and wasted.

In contrast, when the number of CCs is 2 or less, the present embodiment uses format 3 for both when singly transmitting CSI and when simultaneously transmitting ACK/NACK and CSI as shown in FIG. 3, and the present embodiment uses format 1b when ACK/NACK is singly transmitted. This eliminates the necessity for reserving format 2 resources, and can thereby reduce waste of resources compared to the related art.

Here, when the number of CCs is 2 or less, and when only CSI is transmitted, the present embodiment uses excessive resources by an amount corresponding to the difference in resource sizes between format 3 and format 2, but since CSI is periodically generated, the resource amount of CSI is smaller than the resource amount of all subframes. On the other hand, ACK/NACK may be generated in every subframe, and therefore the present embodiment uses format 1b having a small resource size for transmission of ACK/NACK. This makes it possible to reduce waste of resources when simultaneously transmitting ACK/NACK and CSI compared to waste of resources when not simultaneously transmitting ACK/NACK and CSI.

When the number of CCs is 3 or more, the present embodiment transmits ACK/NACK and CSI in format 3 in both cases as shown in FIG. 4. This eliminates the necessity for reserving format 2 resources, and can thereby reduce waste of resources compared to the related art.

Embodiment 2

CSI may include one of CQI, PMI and RI, or two of CQI, PMI and RI or all three of CQI, PMI and RI. RI is information of 1 or 2 bits, and CQI and PMI are information of 5 to 10 bits. A transmission cycle of RI is longer than that of CQI or PMI. For example, the transmission cycle of RI is 60 ms and the transmission cycle of CQI or PMI is 10 ms.

In view of the above-described aspects, Embodiment 2 controls transmission resources of PUCCH reserved in accordance with the number of CCs and contents of CSI. The configurations of a terminal and a base station according to the present embodiment are the same as those shown in FIG. 1 and FIG. 2 used for description of Embodiment 1. The present embodiment is different from Embodiment 1 in operation of control channel formation section 109 of terminal 100.

Figure 7:
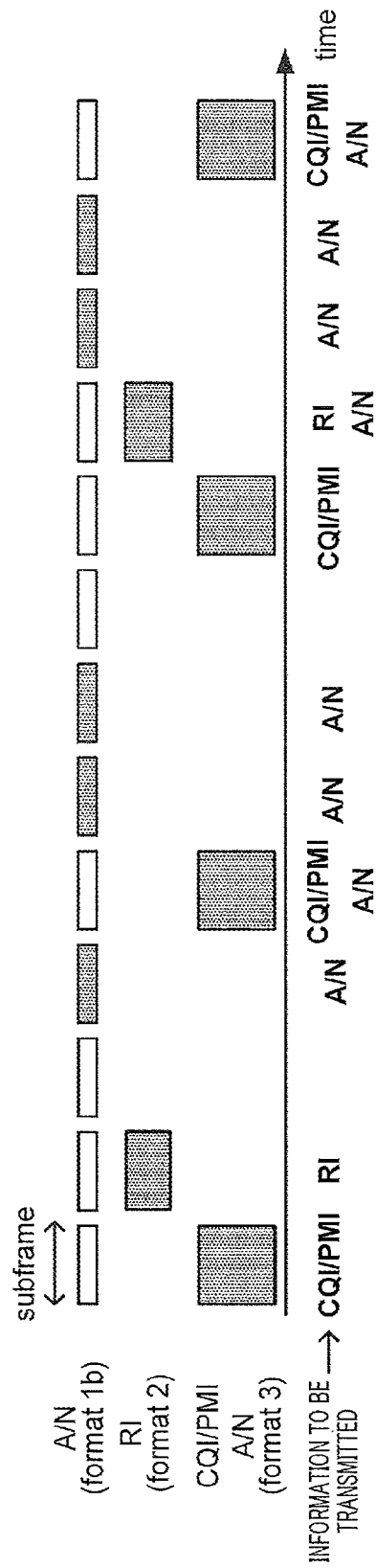
FIG. 7 illustrates an example of Embodiment 2 of the present invention.
Figure 8:
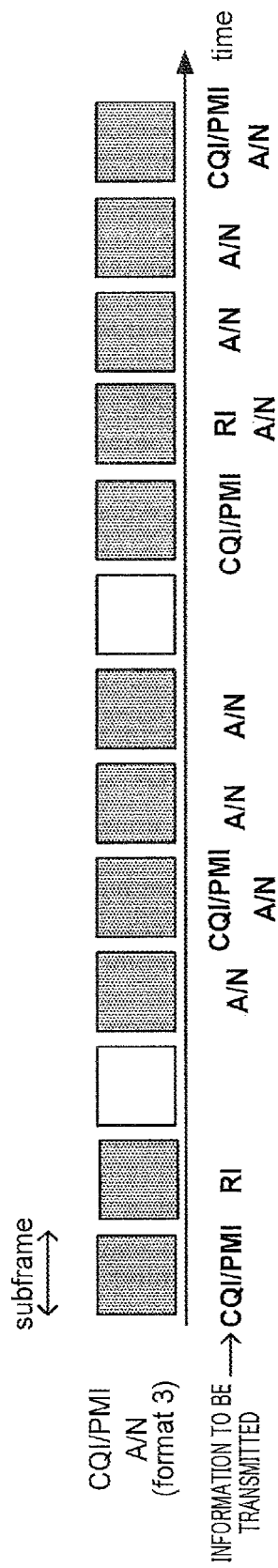
FIG. 8 illustrates an example of Embodiment 2 of the present invention.

Hereinafter, a control channel formation method of terminal 100 according to the present embodiment will be described. FIG. 7 illustrates an example of the present embodiment when the number of CCs is 2 or less. FIG. 8 illustrates an example of the present embodiment when the number of CCs is 3 or more. In FIG. 7 and FIG. 8, white regions represent resources reserved but not used. A/N represents ACK/NACK. In the following description, CSI in which only RI is included is described as "RI" and CSI in which at least one of CQI and PMI is included is described as "CQI/PMI."

When the number of CCs is 2 or less, the present embodiment uses format 2 for both when singly transmitting RI and when simultaneously transmitting RI and ACK/NACK, and when the number of CCs is 3 or more, the present embodiment uses format 3 for both when singly transmitting RI and when simultaneously transmitting RI and ACK/NACK. Format 3 is used irrespective of the number of CCs for both when singly transmitting CQI/PMI and when simultaneously transmitting CQI/PMI and ACK/NACK. Format 1b is used when ACK/NACK is singly transmitted if the number of CCs is 2 or less and format 3 is used if the number of CCs is 3 or more.

For this reason, as shown in FIG. 7, when the number of CCs is 2 or less, terminal 100 always (in every subframe) reserves format 1b resources, reserves format 2 resources at timing of transmitting RI and reserves format 3 resources at timing of transmitting CQI/PMI. As shown in FIG. 8, when the number of CCs is 3 or more, terminal 100 always (in every subframe) reserves format 3 resources.

In the present embodiment, when the number of CCs is 2 or less, terminal 100 need not reserve format 3 at transmission timing of RI and terminal 100 need not reserve format 2 at transmission timing of CQI/PMI, and it is thereby possible to reduce waste of resources compared to the related art. Since neither RI nor ACK/NACK has many bits (on the order of a maximum of 6 bits), if the number of CCs is 2 or less, when RI and ACK/NACK are simultaneously transmitted, it is possible to achieve a sufficiently low error rate even when using format 2 resources. Since physical resources (band, code or time resources) required for transmission of format 2 are fewer than resources required for transmission of format 3, using format 2 for simultaneous transmission of RI and ACK/NACK can reduce resources required for transmission.

In the present embodiment as well as Embodiment 1, when the number of CCs is 3 or more, terminal 100 need not reserve format 2 at transmission timing of CSI, and can thereby reduce waste of resources compared to the related art.

In the present embodiment, when RI and ACK/NACK are simultaneously generated, RI may be dropped (not transmitted) without simultaneously transmitting RI and ACK/NACK. Thus, terminal 100 need not perform multiplexed transmission processing on RI and ACK/NACK in format 2. In this case, base station 200 may assign downlink data so that RI and ACK/NACK are not simultaneously generated. Since the transmission cycle of RI is relatively long, substantial constraints of downlink data assignment are small and the influence on the downlink throughput is small.

A bit string obtained by combining RI and ACK/NACK may be subjected to the same coding (joint coding) and CQI, PMI and ACK/NACK may be subjected to different types of coding (e.g., RM coding) (separate coding). Generally, ACK/NACK rather than CQI or PMI has a lower required error rate, and it is thereby possible to increase coding rates of CQI and PMI and decrease a coding rate of ACK/NACK and encode them separately, and thereby perform transmission that satisfies required error rates efficiently. On the other hand, RI has a required error rate on the same level as that of ACK/NACK, and so performing the same coding allows more bits to be encoded, which improves coding performance and reduce the error rate.

The number of bits of RI differs depending on the number of transmitting antennas (or the maximum number of transmission layers), and the greater the maximum number of transmission layers, the greater the number of bits becomes. Thus, transmission in format 3 may be adopted when the number of bits of RI is greater than a predetermined value and transmission in format 2 may be adopted when the number of bits of RI is equal to or less than the predetermined value.

Embodiment 3

The transmission format of PUCCH used for transmission of ACK/NACK or resources to be used varies depending on the number of CCs. Thus, when an RRC configuration is changed, for example, when SCell is added, fallback operation is performed. In the fallback operation, when downlink data is assigned by only PCC, the same operation as that of the previous release (e.g., Rel. 8) is performed. That is, the terminal transmits ACK/NACK in format 1a/1b. By carrying out fallback operation, the terminal can communicate with the base station even for an indeterminate period from start to completion of a change in the RRC configuration (period during which recognition of ACK/NACK resources may differ between the base station and the terminal. That is, the terminal assigns ACK/NACK to only PCC during an indeterminate period, and thereby allows recognition of ACK/NACK resources to match with that of the base station.

In Embodiment 3, a control channel formation method during fallback operation will be described. The configurations of a terminal and a base station according to the present embodiment are the same as those shown in FIG. 1 and FIG. 2 used to describe Embodiment 1. The present embodiment is different from Embodiment 1 in operation of control channel formation section 109 of terminal 100.

Figure 9:
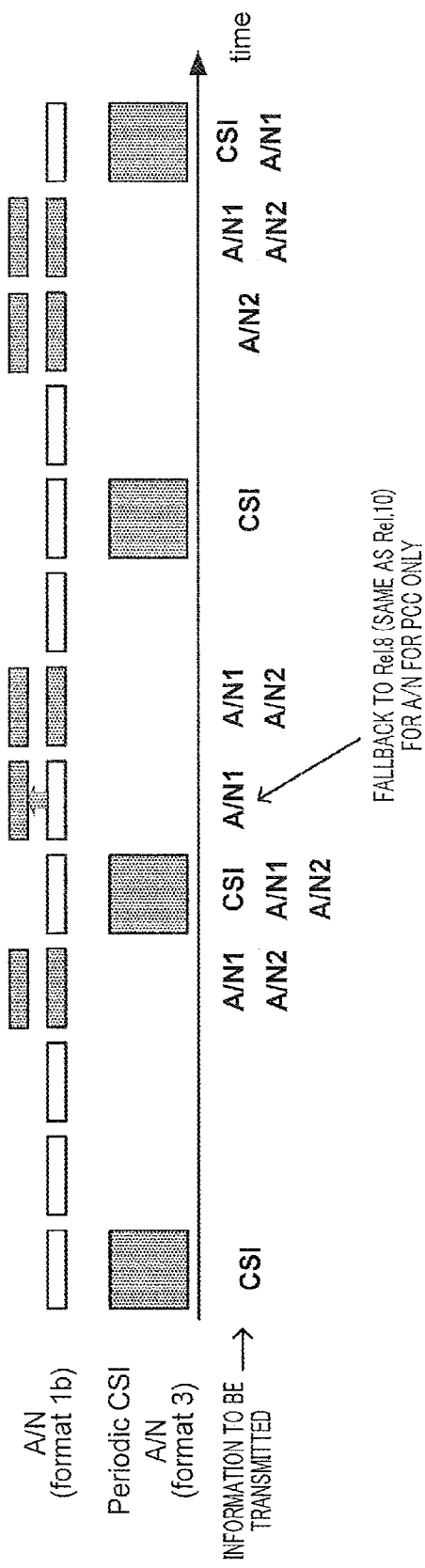
FIG. 9 illustrates an example of Embodiment 3 of the present invention.
Figure 10:
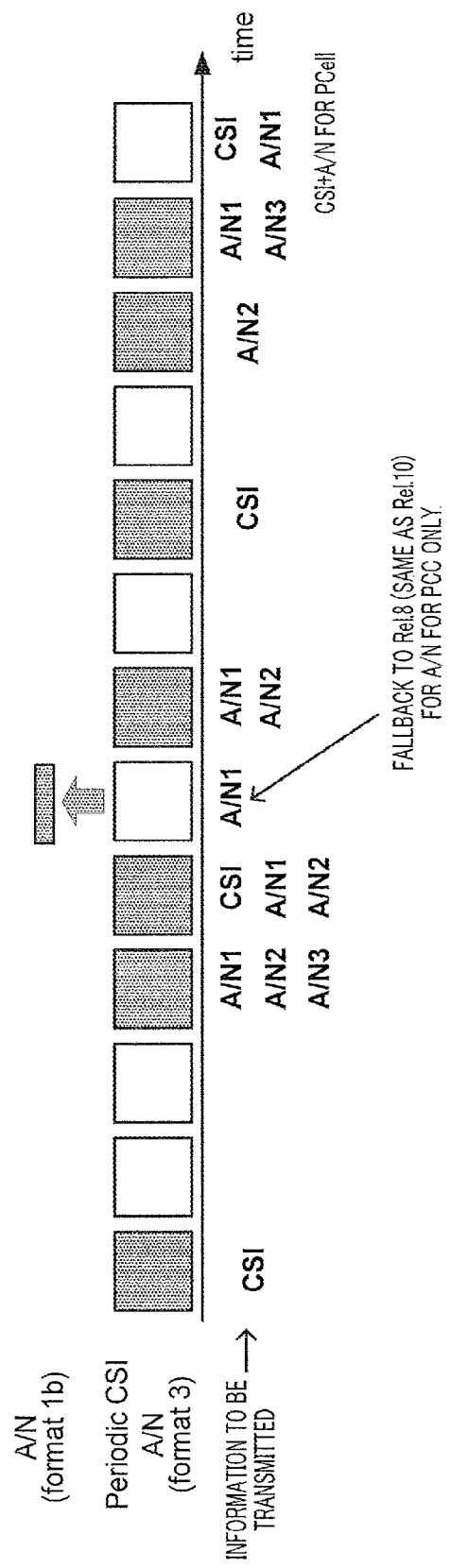
FIG. 10 illustrates an example of Embodiment 3 of the present invention.

FIG. 9 illustrates an example of the present embodiment when the number of CCs is 2 or less. FIG. 10 illustrates an example of the present embodiment when the number of CCs is 3 or more. In FIG. 9 and FIG. 10, white regions represent resources reserved but not used. A/N1 is ACK/NACK intended for PCC, and A/N2 and A/N3 are ACK/NACKs intended for SCC.

As shown in FIG. 9 and FIG. 10, when singly transmitting ACK/NACK intended for PCC, the present embodiment performs a fallback operation to Rel. 8 (or Rel. 10) regardless of the number of CCs, and thus uses format 1a/1b which is the same resource as that in Rel. 8. On the other hand, when simultaneously transmitting ACK/NACK intended for PCC and CSI, the present embodiment uses format 3.

That is, the present embodiment performs a fallback operation in subframes in which CSI is not transmitted and performs no fallback operation in subframes in which CSI is transmitted.

As described above, in the present embodiment, terminal 100 performs a fallback operation only in subframes in which CSI is not transmitted, and can thereby support simultaneous transmission of ACK/NACK and CSI while securing communication with the base station during an indeterminate period. In addition, the base station assigns data to subframes other than subframes in which CSI is transmitted, and thereby allows recognition of ACK/NACK resources to match with that of terminal 100. That is, in the present embodiment, with attention focused on the fact that CSI is periodically (that is, discontinuously) transmitted, terminal 100 performs a fallback operation only in subframes in which CSI is not transmitted, and can thereby simultaneously transmit ACK/NACK and CSI while securing communication during an indeterminate period after a configuration change. In this case, the base station assigns data to subframes other than subframes in which CSI is transmitted, thereby allowing the base station and terminal 100 to carry out communication with matched recognition of ACK/NACK resources.

Embodiment 4

The base station indicates, to terminal 100, resources to be used for transmission of ACK/NACK intended for SCC using an ARI (ACK/NACK Resource Indicator) field of PDCCH (Physical Uplink Control Channel) whereby assignment of downlink data for SCC is indicated. In this case, the base station indicates one resource selected from among four resources configured beforehand for each terminal using 2 bits in PDCCH (hereinafter, this resource is described as "indication resource").

Embodiment 4 will describe a control channel formation method in a case where when the number of CCs is 3 or more, that is, when ACK/NACK is transmitted using format 3 resources, ACK/NACK including ACK/NACK intended for SCC, and CSI are simultaneously transmitted.

The configurations of a terminal and a base station according to the present embodiment are the same as those shown in FIG. 1 and FIG. 2 used to describe Embodiment 1. The present embodiment is different from Embodiment 1 in operation of control channel formation section 109 of terminal 100.

Figure 11:
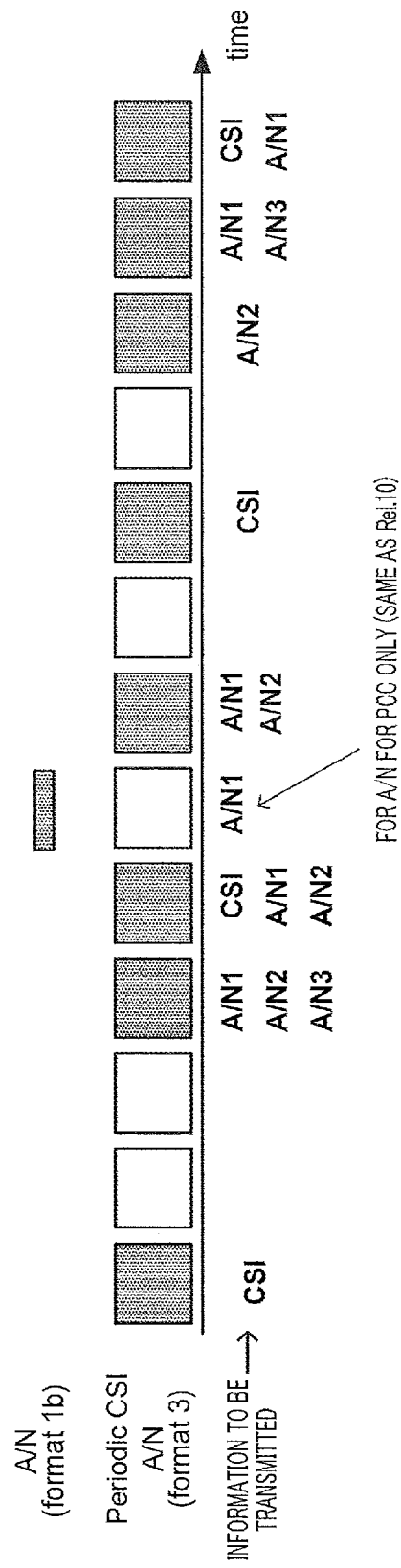
FIG. 11 illustrates an example of Embodiment 4 of the present invention.

FIG. 11 illustrates an example of the present embodiment when the number of CCs is 3 or more. In FIG. 11, A/N1 represents ACK/NACK for PCC, and A/N2 and A/N3 represent ACK/NACKs for SCC.

As shown in FIG. 11, in subframes in which CSI is not transmitted, terminal 100 forms control channels using indication resources (operation of Rel. 10). On the other hand, in subframes in which CSI is transmitted, terminal 100 configures one resource (format 3) for transmitting CSI beforehand (hereinafter, this resource will be described as "configuration resource"). When singly transmitting CSI or when simultaneously transmitting ACK/NACK including ACK/NACK intended for PCC, and CSI, terminal 100 forms control channels using configuration resources. When simultaneously transmitting ACK/NACK including ACK/NACK for SCC, and CSI, terminal 100 forms control channels using one of two methods which will be described below.

(Method 1)

Terminal 100 forms control channels for transmitting control information made up of ACK/NACK including ACK/NACK intended for SCC, and CSI using configuration resources. That is, terminal 100 uses configuration resources regardless of whether there is downlink data assignment intended for SCC or not.

(Method 2)

Terminal 100 forms control channels for transmitting control information made up of ACK/NACK including ACK/NACK for SCC, and CSI using indication resources. That is, terminal 100 uses configuration resources when there is no downlink data assignment intended for SCC and uses indication resources when there is downlink data assignment intended for SCC.

In the case of method 1, since resources for transmitting ACK/NACK and CSI even when PDCCH to which SCC downlink data is assigned cannot be received (reception error) are not different from resources when PDCCH of SCC is successfully received, it is possible to avoid any mismatch in recognition of ACK/NACK resources between the base station and terminal 100. Therefore, the base station need not perform blind detection such as power determination on resources whereby ACK/NACK is transmitted, and can thereby adopt a simpler configuration.

In the case of method 2, since resources when there is ACK/NACK intended for SCC are different from resources when there is no ACK/NACK intended for SCC, base station 200 performs blind detection such as power determination, and can thereby detect whether or not there is any reception error of PDCCH of SCC in terminal 100, that is, make a DTX detection. For this reason, base station 200 can correctly recognize a reception situation of data intended for SCC in terminal 100, perform retransmission with appropriate RV (Redundancy version) in HARQ (Hybrid-Automatic Request), and thereby improve an error rate or throughput. However, since it is necessary to reserve five resources beforehand, this case is suitable for use when there is a sufficient margin in resources such as a cell with fewer users.

Figure 12:
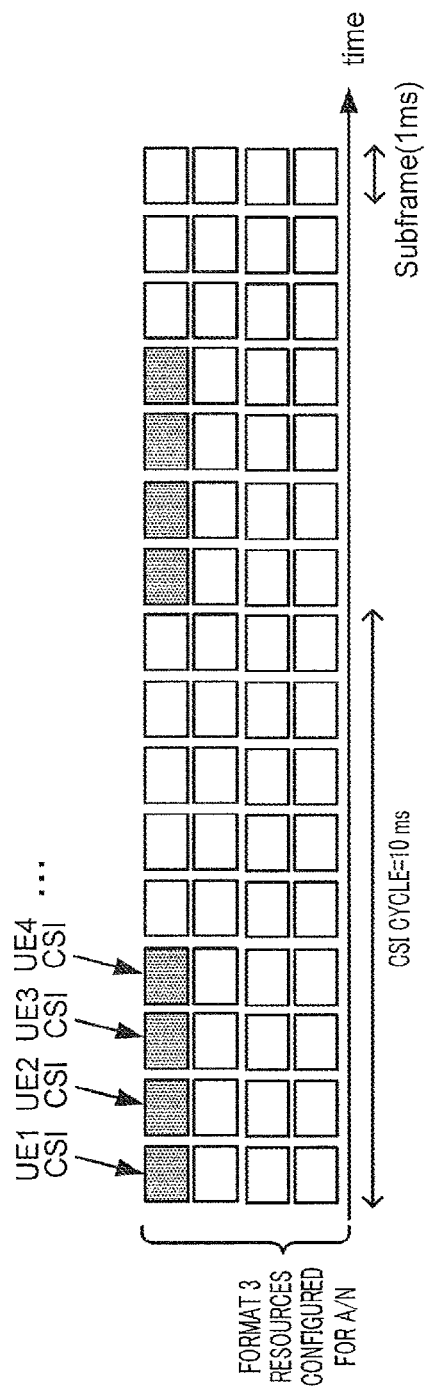
FIG. 12 illustrates an example of a configuration of resources for CSI of Embodiment 4 of the present invention.

In above-described methods 1 and 2, indication resources can be designated as resources to be configured for CSI. FIG. 12 illustrates a configuration example in this case. In the example in FIG. 12, one of four resources intended for ACK/NACK configured for each terminal beforehand is designated as a resource to be configured for CSI. The four resources configured for each terminal are shared by eight terminals. That is, four common resources are configured in terminals (UE) 1 to 8. Transmission timings of CSI are configured to be different from each other and one resource intended for CSI is configured to be the same resource as one of ACK/NACK resources at each timing. Here, the base station activates SCC for each terminal when large capacity transmission data is generated and performs data transmission using both PCC and SCC. When there is no transmission data or the amount of data is small, the terminal de-activates SCC to suppress power consumption of the terminal. The terminal transmits CSI only when SCC is activated. The above-described resource configuration method is effective for a configuration of CSI resources intended for SCC. For example, when SCC of UE1 is activated (that is, data transmission for SCC is intended), it is possible to use resources to be used for ACK/NACK intended for UE1 for CSI (and CSI+ACK/NACK) and the three remaining resources may be shared with other UEs. When SCC of UE1 is de-activated, UE1 does not transmit CSI and ACK/NACK intended for SCC. For this reason, CSI resources intended for UE1 can be used for transmission of ACK/NACK of other terminals. The same can be said to be applicable to CSI resources intended for PCC by associating activation/de-activation with the reception period (on-duration) of a DRX (intermittent reception) operation and non-reception period (DRX period).

This makes it possible to reduce the resource amount to be reserved without reducing the number of terminals to which the resources can be allocated.

The embodiments of the present invention have been described so far.

When the present invention is applied to a TDD (Time Division Duplex) system, a terminal configured with PUCCH format 3 performs the following operation. That is, when transmitting ACK/NACK intended for one subframe of PCC, the terminal performs fallback to format 1a/1b. If there are ACK/NACKs in a plurality of subframes (ARI present) although they are only for PCC, the terminal uses format 3. When transmitting dynamically scheduled ACK/NACKs intended for one subframe of PCC and ACK/NACKs intended for SPS, the terminal performs fallback to a channel selection of Rel. 10. In other cases, the terminal uses format 3. A terminal that supports ACK/NACK of 5 bits or more irrespective of the number of CCs transmits ACK/NACK using format 3. However, in subframes in which CSI is transmitted, the terminal simultaneously transmits CSI and ACK/NACK using format 3.

Although a case has been described in the above-described embodiments where OFDM is used for downlink and DFT-S-OFDM is used for uplink, the present invention is not limited to this, but is also applicable to other transmission schemes.

Although a case has been described in the above-described embodiments where CSI and ACK/NACK are simultaneously transmitted using format 3 of PUCCH, the present invention is also applicable to a case where CSI and ACK/NACK are simultaneously transmitted using other physical channels such as PUSCH.

In each embodiment described above, the present invention is configured using hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

The disclosure of the specification, drawings, and abstract included in Japanese Patent Application No. 2012-053388 filed on Mar. 9, 2012 is incorporated herein by reference in its entirety.

The present invention is useful in mobile communication systems that control the transmission timing of uplink subframes for each CC.

REFERENCE SIGNS LIST

100 Terminal
101 Receiving section
102 FFT section
103 Demodulation section
104 Decoding section
105 Channel quality measuring section
106 ACK/NACK generating section
107 CSI generating section
108 Multiplexing section
109 Control channel formation section
110 DFT-S-OFDM signal generating section
111 Transmitting section
200 Base station
201 Receiving section
202 FFT section
203 Control channel extraction section
204 ACK/NACK demodulation section
205 CSI decoding section
206 Scheduling section
207 Coding section
208 Modulation section
209 Mapping section
210 IFFT section
211 Transmitting section

The invention claimed is:

1. An integrated circuit comprising:
control circuitry, which, in operation, forms a control channel for transmitting control information for one or more of a plurality of component carriers, using a selected one of a plurality of PUCCH (Physical Uplink Control Channel) formats including a first PUCCH format and a second PUCCH format, the plurality of component carriers including a Primary Component Carrier (PCC) and a Secondary Component Carrier (SCC); and
transmission circuitry, which is coupled to the control circuitry and which, in operation, controls transmission of the formed control channel, wherein
responsive to determining that the control information includes only Channel State Information (CSI) for the plurality of component carriers out of ACK/NACK and the CSI, the first PUCCH format is selected and used to form the control channel;
responsive to determining that the control information includes the ACK/NACK and the CSI for the plurality of component carriers, the first PUCCH format is selected and used to form the control channel;
responsive to determining that the control information includes only the ACK/NACK out of the ACK/NACK and the CSI, the second PUCCH format, different from the first PUCCH format, is selected and used to form the control channel;
responsive to determining that the control information includes the ACK/NACK for the SCC and the CSI, and that there is no downlink data assignment for the SCC, the control channel is formed using a resource configured beforehand; and
responsive to determining that the control information includes the ACK/NACK for the SCC and the CSI, and that there is downlink data assignment for the SCC, the control channel is formed using a resource indicated from a base station.

2. The integrated circuit according to claim 1, comprising:
at least one input coupled to the circuitry, wherein the at least one input, in operation, inputs data; and
at least one output coupled to the circuitry, wherein the at least one output, in operation, outputs data.

3. The integrated circuit according to claim 1, wherein, responsive to determining that the control information includes only ACK/NACK for three or more component carriers of the plurality of component carriers out of the ACK/NACK and the CSI, the first PUCCH format is selected and used to form the control channel.

4. The integrated circuit according to claim 1, wherein the plurality of PUCCH formats include a third PUCCH format, and responsive to determining that the control information includes ACK/NACK for one or two of the plurality of component carriers and the CSI, and that the CSI includes only a Rank Indicator (RI) out of CQI (Channel Quality Indicator), PMI (Precoding Matrix Indicator) and the RI, the third PUCCH format is selected and used to form the control channel.

5. The integrated circuit according to claim 1, wherein responsive to determining that the control information includes only the ACK/NACK for the PCC out of the ACK/NACK and the CSI, the second PUCCH format is selected and used to form the control channel.

6. The integrated circuit according to claim 1, wherein, responsive to determining that the control information includes only the CSI out of the ACK/NACK and the CSI and that the control information includes the ACK/NACK for the PCC and the CSI, the control channel is formed using a resource configured beforehand.

7. The integrated circuit according to claim 1, wherein the resource configured for the CSI is set to be the resource indicated from the base station.

8. An integrated circuit comprising:
circuitry, which, in operation:
forms a control channel for transmitting control information for one or more of a plurality of component carriers, using a selected one of a plurality of PUCCH (Physical Uplink Control Channel) formats including a first PUCCH format and a second PUCCH format, the plurality of component carriers including a Primary Component Carrier (PCC) and a Secondary Component Carrier (SCC); and
controls transmission of the formed control channel, wherein
responsive to determining that the control information includes only Channel State Information (CSI) for the plurality of component carriers out of ACK/NACK and the CSI, the first PUCCH format is selected and used to form the control channel;
responsive to determining that the control information includes the ACK/NACK and the CSI for the plurality of component carriers, the first PUCCH format is selected and used to form the control channel;
responsive to determining that the control information includes only the ACK/NACK out of the ACK/NACK and the CSI, the second PUCCH format, different from the first PUCCH format, is selected and used to form the control channel;
responsive to determining that the control information includes the ACK/NACK for the SCC and the CSI, and that there is no downlink data assignment for the SCC, the control channel is formed using a resource configured beforehand; and
responsive to determining that the control information includes the ACK/NACK for the SCC and the CSI, and that there is downlink data assignment for the SCC, the control channel is formed using a resource indicated from a base station.

9. The integrated circuit according to claim 8, comprising:
at least one input coupled to the circuitry, wherein the at least one input, in operation, inputs data; and
at least one output coupled to the circuitry, wherein the at least one output, in operation, outputs data.

10. The integrated circuit according to claim 8, wherein, responsive to determining that the control information includes only ACK/NACK for three or more component carriers of the plurality of component carriers out of the ACK/NACK and the CSI, the first PUCCH format is selected and used to form the control channel.

11. The integrated circuit according to claim 8, wherein the plurality of PUCCH formats include a third PUCCH format, and responsive to determining that the control information includes ACK/NACK for one or two of the plurality of component carriers and the CSI, and that the CSI includes only a Rank Indicator (RI) out of CQI (Channel Quality Indicator), PMI (Precoding Matrix Indicator) and the RI, the third PUCCH format is selected and used to form the control channel.

12. The integrated circuit according to claim 8, wherein responsive to determining that the control information includes only the ACK/NACK for the PCC out of the ACK/NACK and the CSI, the second PUCCH format is selected and used to form the control channel.

13. The integrated circuit according to claim 8, wherein, responsive to determining that the control information includes only the CSI out of the ACK/NACK and the CSI and that the control information includes the ACK/NACK for the PCC and the CSI, the control channel is formed using a resource configured beforehand.

14. The integrated circuit according to claim 8, wherein the resource configured for the CSI is set to be the resource indicated from the base station.

* * * * *